United States Patent [19]
Langdon et al.

[11] Patent Number: 5,353,109
[45] Date of Patent: Oct. 4, 1994

[54] RECEIVER-TRANSMITTER FOR A TARGET IDENTIFICATION SYSTEM

[75] Inventors: Roger M. Langdon, Colchester; William R. McKnight, Skelmorlie, both of United Kingdom

[73] Assignee: Gec-Marconi Limited, Stanmore, United Kingdom

[21] Appl. No.: 37,433

[22] Filed: Mar. 26, 1993

[30] Foreign Application Priority Data

Mar. 28, 1992 [GB] United Kingdom ............ 9206840.2

[51] Int. Cl.$^5$ .................. G01P 3/36; G01B 9/02
[52] U.S. Cl. .................. 356/28.5; 73/657; 356/349
[58] Field of Search ............ 250/201.9; 356/5, 349, 356/28.5; 73/657

[56] References Cited

U.S. PATENT DOCUMENTS

| | | | |
|---|---|---|---|
| 3,746,454 | 7/1973 | Pace et al. | 356/152 |
| 4,020,340 | 4/1977 | Cooke . | |
| 4,193,088 | 3/1980 | Moran | 358/95 |
| 4,195,221 | 3/1980 | Moran | 358/95 |
| 4,515,472 | 5/1985 | Welch | 356/5 |
| 4,707,698 | 11/1987 | Constant | 356/4.5 |
| 4,887,310 | 12/1989 | Meyzonnette et al. . | |
| 4,906,092 | 3/1990 | O'Meara | 356/5 |
| 5,042,922 | 8/1991 | Pepper | 359/95 |
| 5,200,793 | 4/1993 | Ulich et al. | 356/5 |

FOREIGN PATENT DOCUMENTS

| | | |
|---|---|---|
| 0018279 | 10/1980 | European Pat. Off. . |
| 2145894 | 4/1985 | United Kingdom . |
| 2229882 | 10/1990 | United Kingdom . |

OTHER PUBLICATIONS

Optical Engineering, vol. 20, No. 6, Nov., 1981, pp. 976–980, "Dual Active/Passive Infrared Imaging Systems", R. C. Harney.

Primary Examiner—Stpehen C. Buczinski
Attorney, Agent, or Firm—Spencer, Frank & Schneider

[57] ABSTRACT

A receiver-transmitter for a target identification system having a particular but not necessarily an exclusive application for the identification of aircraft which utilizes laser vibrometry and a coherent array receiver including an array of photodetectors adapted to receive signals from different parts of the target and to use a corresponding array of frequency-offset reference beams to provide coherent detection of each of the received signals.

20 Claims, 5 Drawing Sheets

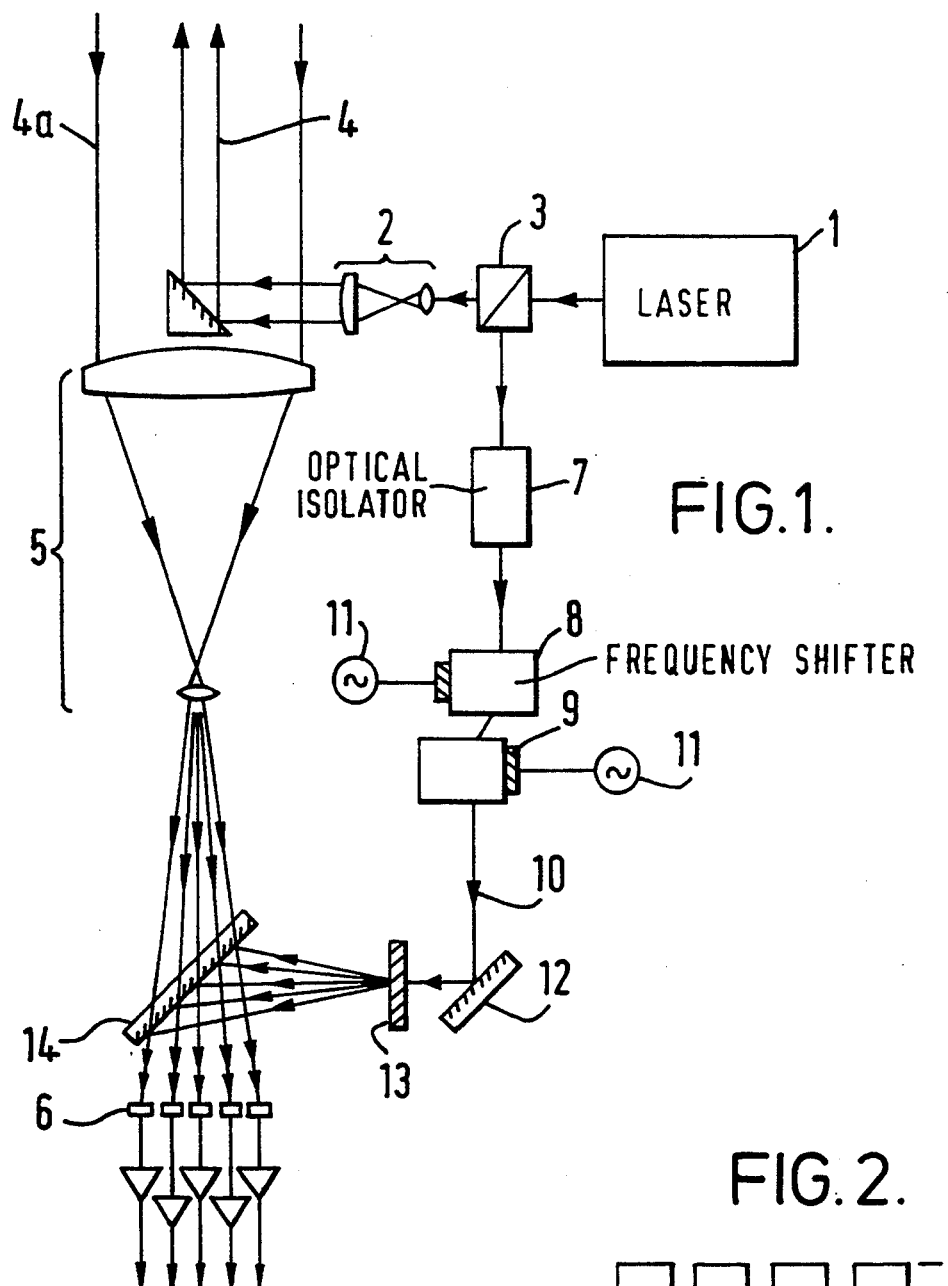

RECEIVER-TRANSMITTER FOR A TARGET IDENTIFICATION SYSTEM

BACKGROUND OF THE INVENTION

The invention relates to a receiver-transmitter for a target identification system having a particular but not necessarily an exclusive application for the identification of aircraft.

The identification of targets, such as aircraft, utilising lasers involves the coherent detection of scattered light from the targets which in the case of aircraft, would be travelling at high speed and would, therefore, produce a large Doppler-shift in the received signal. For a laser wavelength of 1 μm, the Doppler shift is 2 MHz per meter/second of relative target velocity. Thus, for aircraft travelling towards an observer at Mach 2, the Doppler shift is of the order of 1 GHz. A laser vibrometer detection system would have to lock onto this Doppler frequency and measure the frequency modulation imposed by the target vibration.

With such an arrangement, the FM sidebands would be only a few kHz away from the centre frequency and so could be difficult to detect, especially if the signal-to-noise ratio of the return signal from the target is low.

A major problem with such systems is laser frequency stability which introduces FM noise into the coherently detected signal, and so affects the ability of the system to detect signal sidebands close-in to the carrier. This is a serious problem at long range, where the long time delay between transmitted and return signals introduces a large amount of phase-decorrelation between signal and reference beams in the receiver, leading to increased FM noise.

The identification of targets utilising lasers and, in particular, laser vibrometry is normally effected by focusing a laser beam onto a diffraction-limited spot on the surface of the target and by detecting the backscatter from the target by means of a telescope located adjacent to or coaxial with the laser transmitter. The light wave received at the telescope is focused onto a photodetector where it is combined with a low-power reference wave derived from the laser transmitter. Interference between the two waves generates a heterodyne photocurrent on the photodetector which is selected by a phase-locked loop tracking filter. Periodic variations in the Doppler frequency due to target vibration appear as a modulation voltage in the phase-locked loop output.

A system for detecting vibration signatures from targets, such as aircraft, will require either some means for locking the transmitted beam onto the relevant part of the aircraft surface whilst the vibration signature is being detected, or a relatively wide-field transmitted beam which illuminates a substantial area and does not require precise beam positioning on the target.

In view of the difficulty of locking beams onto high speed targets, such as aircraft, some form of array receiver is required for detecting/identifying such targets.

SUMMARY OF THE INVENTION

It is an object of the present invention to overcome the difficulties, referred to above, of locking beams onto high speed targets by providing a receiver-transmitter for target identification systems which utilizes laser vibrometry and a coherent array receiver.

The invention provides a receiver-transmitter for a target identification system including laser means for generating and focusing a laser beam onto the reflective surface of a target to be identified, collection means for collecting the reflected signal from the target, an array of photodetectors onto at least one of which the collected signals is focused, generation means connected to the output of the laser means for generating a frequency-shifted reference beam from the laser beam, beam division means for dividing the reference beam into a number of separate reference beams, each having substantially equal power, and beam splitting means for causing each of the reference beams to be focused onto a separate one of the photodetectors of the array, the focusing of the collected signal onto the photodetector array being such that the reference and collected beams incident on the same photodetector are collinear.

According to one aspect of the present invention, a receiver-transmitter for a target identification system is provided which includes, for each of the photodetectors of the array, amplifying means connected to the photodetector output and frequency demodulation means connected to the output of the amplifying means.

According to another aspect of the present invention, a receiver-transmitter for a target identification system is provided which includes beam steering means for directing the laser beam in the direction of the target.

The photodetector array can be in the form of an $N \times N$ rectangular array or a quadrant array of four photodetectors.

The beam division means can be either a Dammann grating or a hologram which provide a means of effecting coherent detection of each signal.

The utilisation of a receiver-transmitter according to the present invention in a target identification system may also require the use of at least one retroreflective device located on or in the surface of the target, for example an aircraft, to be detected in order to increase the signal-to-noise ratio of the return signal from the target and to thereby extend the range of the identification system. Such retroreflective devices could be provided by the retroreflective devices covered by our co-pending U.K. patent application No. 9301744.0 filed on Jan. 29, 1993 (claiming the priority of Abandoned U.K. Application No. 9206847.7 filed Mar. 28, 1992) and U.K. patent application No. 9301743.2 (which is a counterpart of U.S. patent application Ser. No. 08/038,342 filed Mar. 30, 1993).

BRIEF DESCRIPTION OF THE DRAWINGS

The foregoing and other features according to the present invention will be better understood from the following description with reference to the accompanying drawings, in which:

FIG. 1 illustrates in the form of a block diagram a receiver-transmitter according to the present invention for a target identification system, FIG. 2 illustrates in a plan view part of one arrangement for a photodetector array for the receiver-transmitter illustrated in FIG. 1, FIG. 3 illustrates in a plan view another arrangement for a photodetector array for the receiver-transmitter illustrated in FIG. 1.

Figure 4:
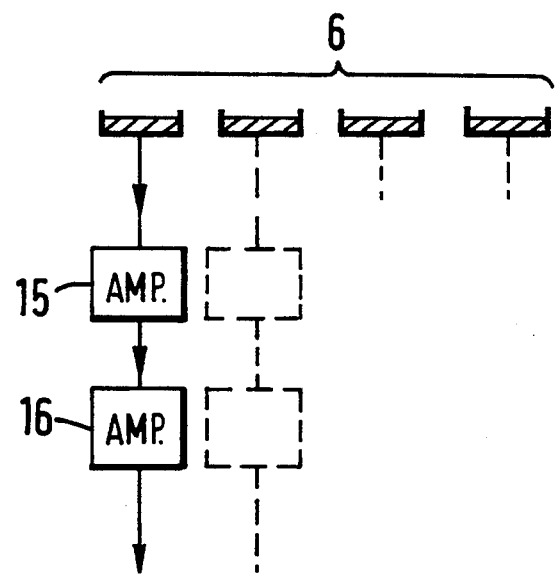
FIG. 4 illustrates in the form of a block diagram a frequency demodulation circuit for the receiver-transmitter illustrated in FIG. 1.

A receiver-transmitter according to the present invention for a target identification system is illustrated in FIG. 1 of the drawings and includes a single frequency CW Neodymium-YAG laser 1 the laser beam output of which is connected to a telescope 2 via a beam splitter 3. The laser beam is expanded by the telescope 2 to form a slightly diverging beam 4 which is focused onto a remote target to be identified by a scanning mirror system (not shown in FIG. 1).

The target onto which the laser beam is focused may, for example, be an aircraft, and the light 4a scattered by the surface of the aircraft and/or a retroreflective device located in or on the surface of the aircraft is returned in the direction of the receiver-transmitter and is collected by a receiving telescope 5 after passing in the reverse direction through the scanning mirror system referred to above.

In order to minimise the overall aperture of the scanning mirror system, it is convenient to make the transmitted and collected beams 4 and 4a, respectively coaxial as illustrated in FIG. 1.

The receiver-transmitter of FIG. 1 also includes an array 6 of photodetectors onto at least one of which the reflected beam 4a is focused by the telescope 5. The array 6 of photodetectors could for example be in the form of a rectangular array of N×N photodetectors 25 as shown in FIG. 2 of the drawings. Alternatively, the array 6 of photodetectors could be a quadrant array of 4 photodetectors 26 as illustrated in FIG. 3 of the drawings.

In operation, if the angular position of the target changes, while it remains within the limited angular field of the transmitted laser beam, then the return beam 4a will be caused to move from one photodetector in the array 6 to another one of the photodetectors in the array 6.

The beam splitter 3 causes part of the laser beam output of the laser 1 to be diverted to an optical isolator 7 the output of which is connected to the input of a pair of cascaded acousto-optic frequency shifters 8 and 9. The output of the frequency shifters 8 and 9 provides a reference beam 10 for the receiver-transmitter. The cascaded frequency shifters 8 and 9 are identical devices driven from the same R.F. frequency generators 11 so that the light output of the isolator 7 which is diffracted through both of the frequency shifters 8 and 9, emerges undeflected at the output of frequency shifters 8 and 9, but shifted in frequency by twice the frequency of the generators 11. This arrangement provides a convenient means for changing the frequency of the laser beam output of the laser by a known amount without causing a change in beam direction.

The frequency-shifted reference beam 10 is deflected by a mirror 12 and passes through a beam divider 13 which divides the reference beam 10 into a number of separate beams, each having substantially equal power and relatively small angular displacements relative to each other.

The array of reference beams emerging from the beam divider 13 is directed by a beam splitter 14 in such a direction that each reference beam is focused onto a separate one of the photodetectors of the array 6. The optical geometry of the beam splitter 14 is such that the reference and collected beams incident on the same photodetector are collinear. The beam divider 13 can, for example, be a Dammann grating or a hologram which provides a means of effecting detection of each signal.

Interference between the reference and collected beams on the surface of a photodetector produces an AC photocurrent in the photodetector output at a frequency equal to the difference between the reference and collected beam frequencies. This process is normally referred to as heterodyne mixing.

The heterodyne frequency is equal to the total frequency shift in the reference beam introduced by the acousto-optic frequency shifters 8 and 9, minus the Doppler frequency shift in the collected beam produced by relative motion between the remote target that is being detected and the receiver-transmitter. The R.F. frequency applied to the frequency shifters 8 and 9 can be adjusted in accordance with the relative velocity of the target, to substantially cancel out the Doppler shift arising from target motion, to produce a heterodyne current in the photodetector output at a conveniently low frequency. This could, for example, be 1 MHz which is easy to process by conventional low-speed circuits.

The heterodyne photocurrent from each photodetector in the array is separately processed by a number of identical circuits as illustrated in FIG. 4 of the drawings. As illustrated in FIG. 4, the photocurrent output of each of the photodetectors of the array 6 is amplified by an amplifier 15 and is passed to a frequency demodulator 16 which produces an output proportional to small deviations in input frequency about the mean frequency. The frequency demodulators 16 could be provided by any one of a number of conventional demodulators used in FM radio receivers.

The output of each of the demodulators 16 is proportional to small changes in target velocity, and therefore provides an analogue of the oscillatory motion of the target created by applied vibration.

Figure 6:
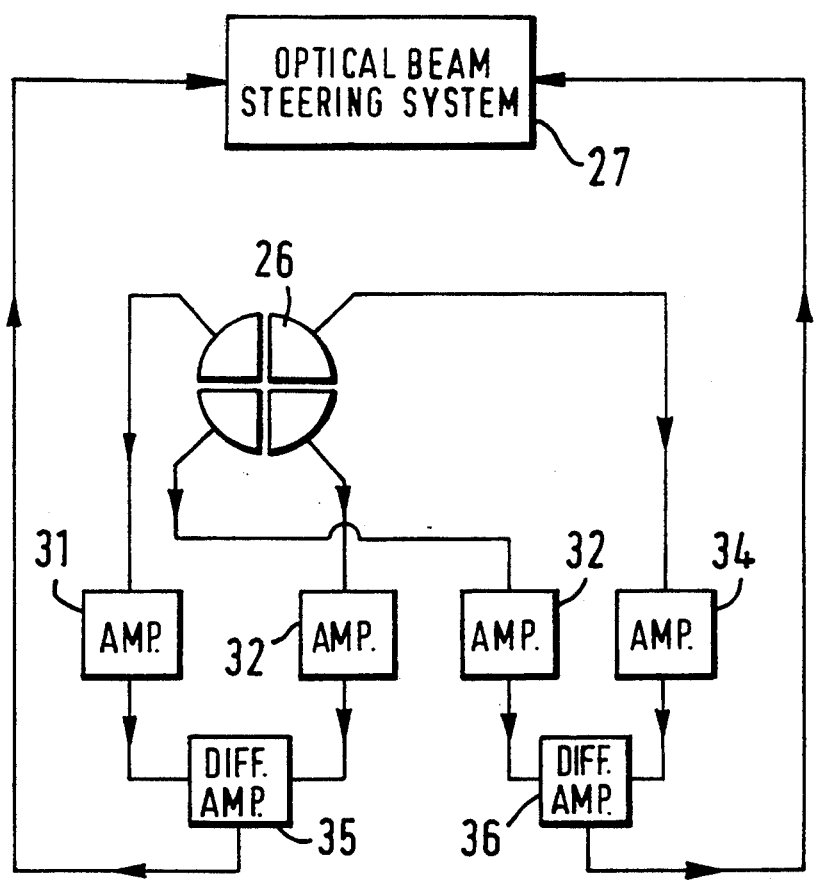
FIG. 6 illustrates beam steering means for the receiver-transmitter according to the present invention, FIG. 7A and 7B respectively illustrate in a plan view and front view a retroreflective device for the target identification system illustrated in FIG. 5 of the drawings, FIGS. 8A and 8B respectively illustrate in a front view and plan view a geometrically distributed array of the retroreflective devices illustrated in FIGS. 7A and 7B of the drawings.

With vibrating targets such as an aircraft, some means is required for controlling the direction of the transmitted laser beam to ensure that it continually illuminates the target while it is rapidly moving. This can be achieved by measuring the relative amplitudes of the heterodyne signals utilising the optical beam steering system illustrated in FIG. 6 of the drawings which includes the photodetector array 26 illustrated in FIG. 3 of the drawings and additional circuitry connected to the outputs of the array 26 for measuring the relative amplitudes of the output signals of each of the four photodetectors of the array 26. This is effected by passing the output of each of the quadrants of the array 26 through a separate one of the amplifier circuits 31 to 34, each one of which effects amplification of the heterodyne output of a respective one of the quadrants of the array 26 to produce a voltage proportional to the heterodyne output. The outputs from the amplifier circuits 31 and 32 are applied to a differential amplifier 35 and the outputs from the amplifier circuits 33 and 34 are applied to a differential amplifier 36. The outputs of the differential amplifiers 35 and 36 which are each proportional to the difference between the two input voltages, are applied to the optical beam steering system 27 of the receiver-transmitter for effecting any necessary realignment of the collected beam 4a onto the centre of the photodetector array 26.

If it is assumed that the target is initially aligned on the centre of the photodetector array, then the outputs from all four photodetectors 26 of the array will be the same. Small movements in target position will deflect the collected beam 4a thereby causing an imbalance in signals from each of the photodetectors 26 of the array. Measurement of the relative amplitudes of the heterodyne signals from each photodetector 26 by amplifier circuits 31–34 and differential amplifiers 35 and 36 will therefore indicate the magnitude and direction of target motion. Correction signals can therefore be derived, in the manner outlined above from differences in relative amplitude between one photodetector and another photodetector and the drive mechanism for the beam steering mirror system located in front of the receiver-transmitter can be operated to effect realignment of the collected beam 4a onto the centre of the photodetector array. With this arrangement, the transmitted laser beam 4 can be utilised to track the motion of a target.

The output signal of the demodulator 16 of each of the photodetectors of the array 6 is dependent not only on target vibration, but also on laser frequency variations, and on random fluctuations in the refractive index of the atmospheric path between the receiver-transmitter and the target. The laser frequency normally varies in a random fashion, with a typical spectral width of a few kHz, which may be of sufficient magnitude to interfere with vibration signals from the target.

Figure 5:
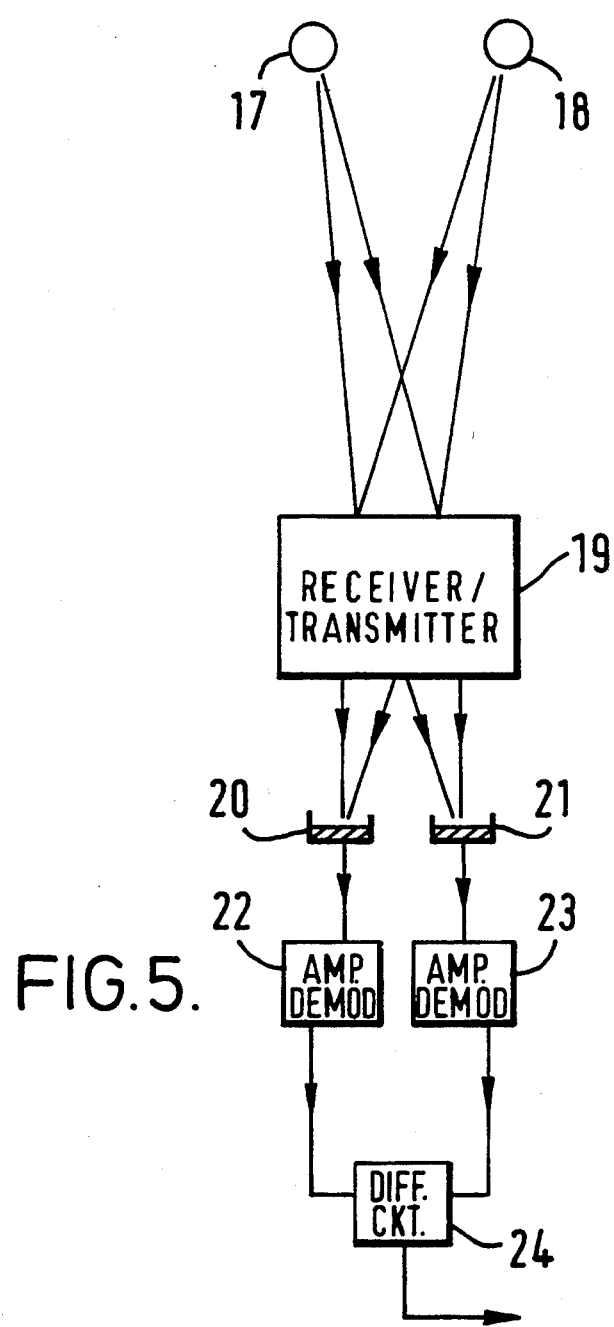
FIG. 5 illustrates a target identification system which includes the receiver-transmitter illustrated in FIG. 1.

The spurious output signals from these sources may be largely removed by using the target identification system which is illustrated in FIG. 5 of the drawings in the form of a block diagram.

As illustrated in FIG. 5, the target identification system includes two retroreflective devices 17 and 18 located on or in the surface of the target to be identified and a receiver-transmitter 19 of the type illustrated in FIG. 1 of the drawings.

The retroreflective devices 17 and 18 may be provided by the retroreflective devices covered by our co-pending U.K. Patent application No. 9301744.0 and U.S. patent application Ser. No. 08/038,342. Such devices will greatly enhance the range of the target identification system because the retroreflective devices will cause the signal-to-noise ratio of the return signal 4a to be increased.

Figure 7A:
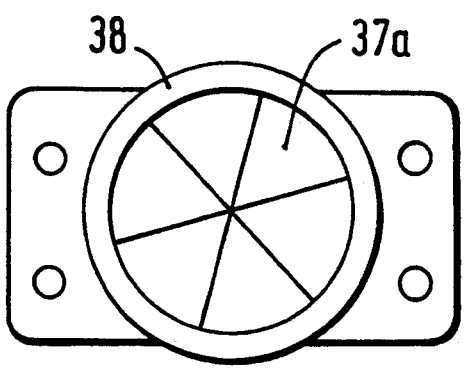
Figure 7B:
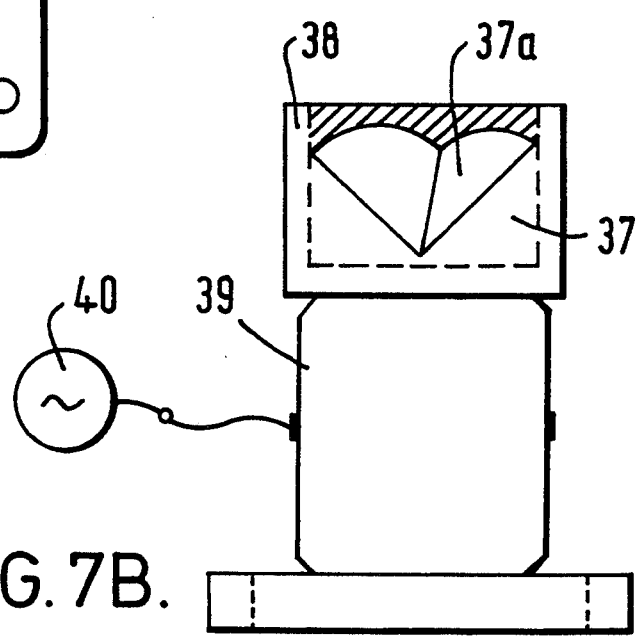

The receiver-transmitter 19 is adapted to cause the reflected signals from each of the retroreflective devices 17 and 18 to be incident on a separate photodetector 20 and 21. One example of a retroreflective device that could be used for the retroreflective devices 17 and 18 of FIG. 5 is illustrated in FIGS. 7A and 7B of the drawings respectively in a plan view and front view. This retroreflective device includes a corner-cube reflector 37 having reflective surfaces 37a and is mounted in a holder 38 that is caused to move in an oscillatory manner by actuation means 39 driven by an alternating voltage source 40.

The outputs from each of the photodetectors 20 and 21 respectively pass through separate amplifier/demodulator circuits 22 and 23 and are then compared in a difference circuit 24 which subtracts one signal from the other. Spurious signals arising from the factors referred to above produce equal signals on the two output signals of the amplifier/demodulator circuits 22 and 23 which are removed in the subtraction process effected by the circuit 24. The remaining signal emerging from the difference circuit 24 is therefore the difference in vibration amplitudes of the two retroreflective devices 17 and 18.

If only one of the retroreflected devices 17 and 18 is allowed to vibrate, for example, by removing the alternating voltage source 40 (see FIG. 7B) from one of the retroreflective devices then the difference signal at the output of the circuit 24 will be proportional to the vibration amplitude of the vibrating retroreflective device. Alternatively, if both retroreflective devices are caused to vibrate at the same frequency by the actuation means 39 and the alternating voltage source 40 (see FIG. 7B), but in antiphase, then the difference signal at the output of the circuit 24 will be proportional to twice the vibration amplitude of the retroreflective devices.

The modulation of the collected beam 4a could also be effected by incorporating a variety of devices in the target identification systems, for example, optical switching devices which could be used to effect modulation of the collected beam, i.e. the backscattered light from the target, in order to provide a means for communicating, covert or otherwise, between the detected aircraft and the ground receiver-transmitter, or between two aircraft.

The use of high gain retroreflective devices in aircraft identification systems will increase the aircraft's visibility to hostile laser radar and it is, therefore, necessary to utilise in such systems a means of minimising this visibility. One method of achieving this would be to use narrow band wavelength-selective filters in front of the scattering surface for example, by coating the reflective surfaces 37a of the retroreflective device of FIGS. 7A and 7B with a suitable filter material or by selectively operating the optical switch referred to above only in response to a coded signal on the transmitted beam 4.

Figure 10:
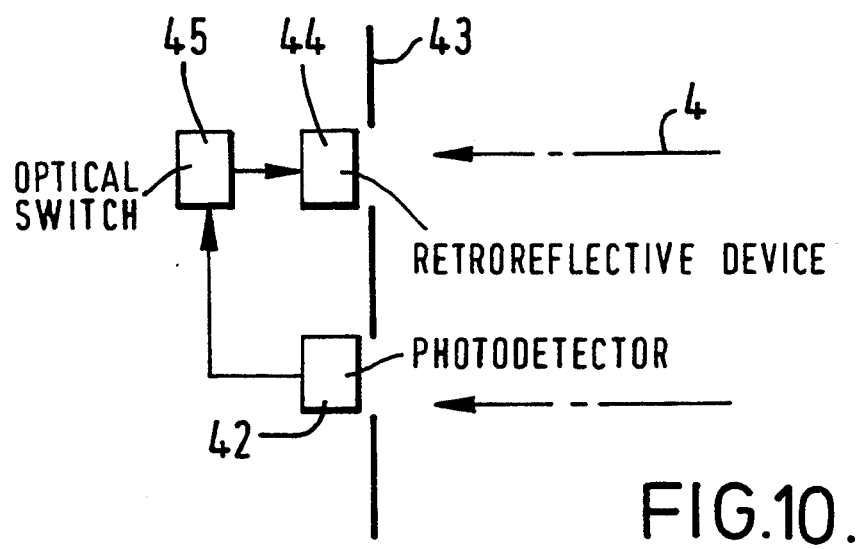
FIG. 10 illustrates an optical switching arrangement for a target identification system.

The activation of the optical switch, for example, optical switch 45 as illustrated in FIG. 10, could be effected by means of a photodetector 42 located in the aircraft 43 in close proximity to the retroreflective device 44. If the optical switch 46 is normally closed, then on receipt of a coded signal on the transmitted beam 4 by the photodetector 42, the optical switch 45 would be caused to open by actuation of the optical switch 45 which will activate the retroreflective device 44 and the modulated signal would be returned to the receiver of the identification system, thus identifying a friendly aircraft.

The visibility of the retroreflective devices to hostile laser radar could also be minimised by reducing the physical size of the devices to the point where the absolute minimum signal-to-noise ratio is obtained at maximum range.

Figure 8A:
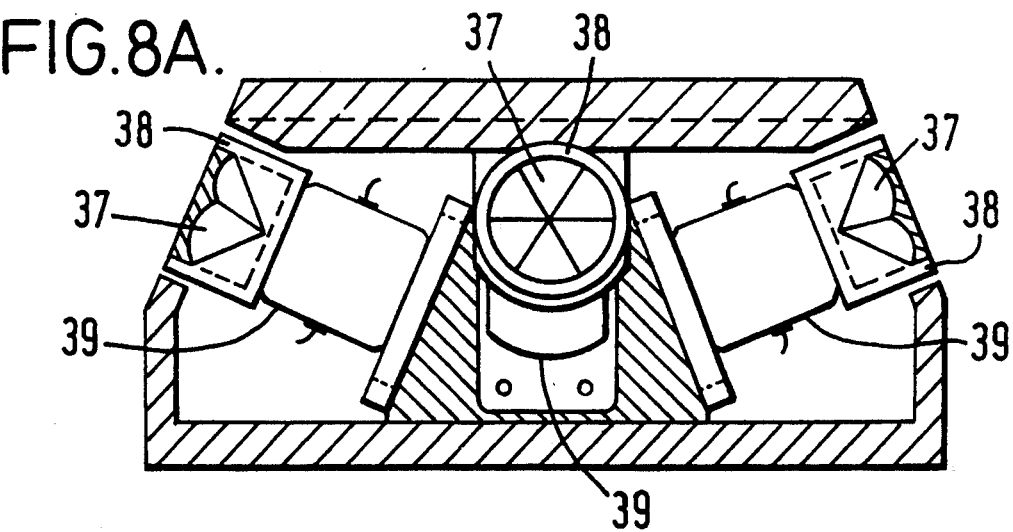
Figure 8B:
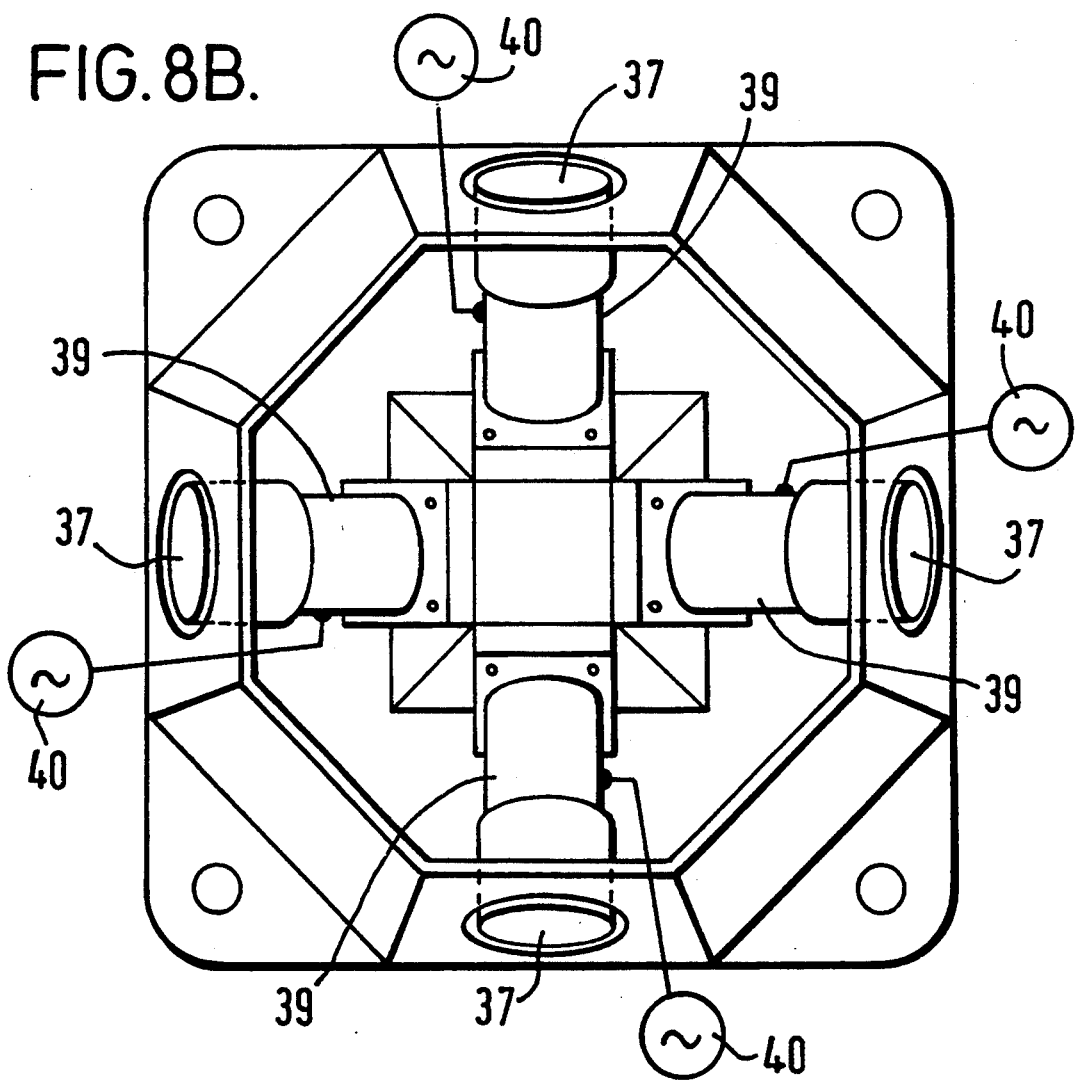
Figure 9:
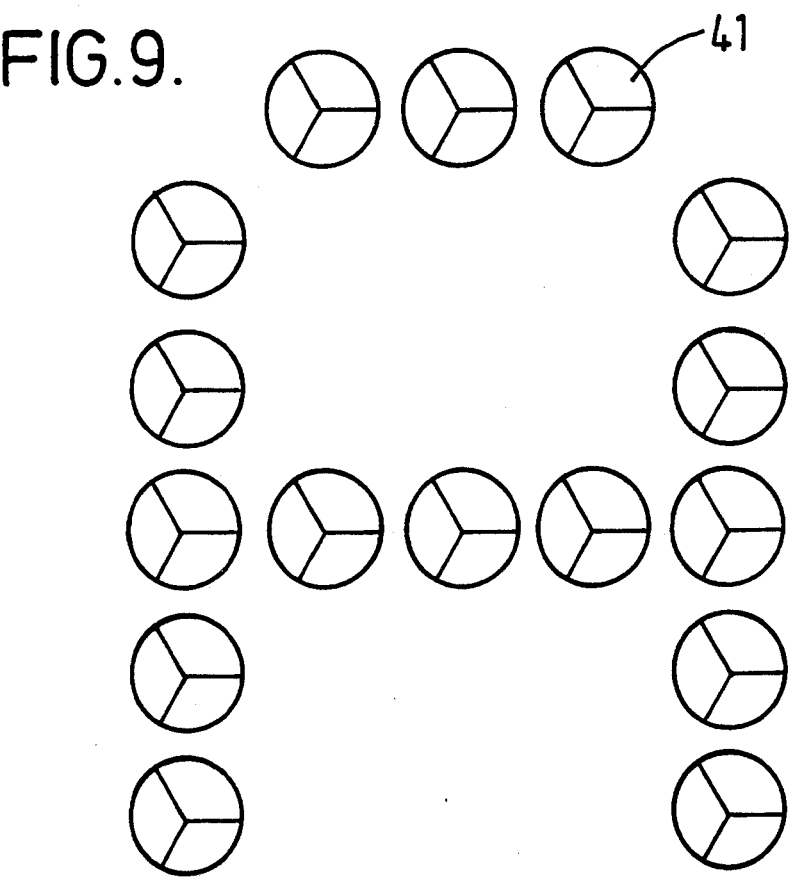
FIG. 9 illustrates in a plan view an array of the retroreflective devices illustrated in FIGS. 7A and 7B of the drawings in the form of an alpha-numeric character.

In an alternative arrangement for a target identification system, a number of the retroreflective devices could be arranged on the target in any desired geometrically distributed form, for example, as illustrated in FIGS. 8A and 8B of the drawings respectively in a front view and plan view, a cluster of four of the corner-cube reflectors 37 illustrated in FIGS. 7A and 7B of the drawings pointing in different directions and separately driven by the actuation means 39 and alternating voltage source 40. As each retroreflective device points in a different direction, at least one of the devices will be visible on the target from the receiver-transmitter for any orientation of the target. Alternatively, a geometrically distributed array of retroreflective devices 41, for example, the devices illustrated in FIGS. 7A and 7B of the drawings, could be arranged in the form of an alphanumeric character, as illustrated in plan view in FIG. 9, to provide an additional means of identification when the signal received from each of these devices are imaged onto the photodetector array 6 of the receiver-transmitter.

We claim:

1. A receiver-transmitter for a target identification system, including
    laser means for generating and focusing a laser beam for transmission to a reflective surface of a target to be identified;
    collection means for collecting a reflected signal from the target and producing a collected signal having collected beams;
    an array of photodetectors, at least one of the photodetectors having the collected signal focused thereon;
    generation means, connected to an output of the laser means, for generating a frequency-shifted reference beam from the laser beam;
    beam division means for dividing the reference beam into a number of separate reference beams each having substantially equal power; and
    beam splitting means for causing each of the reference beams to be focused onto a separate one of the photodetectors of the array, the focusing of the collected signal onto the photodetector array being such that the reference and collected beams incident on the same photodetector are collinear.

2. A receiver-transmitter for a target identification system as claimed in claim 1 further including
    amplifying means for each of the photodetectors of the array, connected to a corresponding photodetector output; and
    frequency demodulation means for each of the photodetectors of the array, connected to an output of the corresponding amplifying means.

3. A receiver-transmitter for a target identification system as claimed in claim 1 wherein the array of photodetectors is a rectangular array of N×N photodetectors.

4. A receiver-transmitter for a target identification system as claimed in claim 1 wherein the array of photodetectors is a quadrant array of four photodetectors.

5. A receiver-transmitter for a target identification system as claimed in claim 1 wherein the transmitted laser beam and the reflected signal are substantially coaxial.

6. A receiver-transmitter for a target identification system as claimed in claim 1 wherein the generation means include
    a beam splitter for causing part of the laser beam generated by the laser means to be diverted to an optical isolator;
    a pair of cascaded acousto-optic frequency shifters having an input connected to an output of the optical isolator; and
    frequency drive means for the cascaded frequency shifters for causing the frequency of an output signal of the cascaded frequency shifters to be shifted by twice the frequency of the drive means.

7. A receiver-transmitter for a target identification system as claimed in claim 1 wherein the beam division means is either a Dammann grating or a hologram.

8. A receiver-transmitter for a target identification system as claimed in claim 4, further including an optical beam steering means for directing the laser beam in the direction of the target.

9. A receiver-transmitter for a target identification system as claimed in claim 8 wherein the optical beam steering means includes means connected to the outputs of the array of photodetectors for measuring the relative amplitudes of the output signals of each of the photodetectors of the array and thereby deriving an output signal indicative of the position at which the collected signal is incident on the array, the output signal driving the optical beam steering system of the receiver-transmitter to effect realignment of the collected beam onto the centre of the array of photodetectors.

10. A target identification system including a receiver-transmitter as claimed in claim 1.

11. A target identification system as claimed in claim 10 further including at least one retroreflective device located on or in the surface of a target to be detected.

12. A target identification system further including
    two retroreflective devices vibrating at a respective vibration amplitude and located on or in the surface of a target to be detected;
    a receiver-transmitter as claimed in claim 2, adapted to cause the reflected signal from each of the retroreflective devices to be incident on a separate photodetector of the array; and
    means for comparing the output signals of the frequency demodulation means and producing a differential signal indicative of the difference in vibration amplitudes of the retroreflective devices.

13. A target identification system as claimed in claim 12 wherein only one of the retroreflective devices is vibrating and wherein the difference signal is proportional to the vibration amplitude of the other one of the retroreflective devices.

14. A target identification system as claimed in claim 12 wherein both retroreflective devices are vibrating at the same frequency, but in antiphase, and wherein the difference signal is proportional to twice the vibration amplitude of the retroreflective devices.

15. A target identification system as claimed in claim 11 further including a geometrically distributed array of retroreflective devices.

16. A target identification system as claimed in claim 15 wherein the array of retroreflective devices are in the form of an alpha-numeric character.

17. A target identification system as claimed in claim 11 further including an optical switch for effecting at least one of modulation and selective blocking of the respective reflected signal from each of the at least one retroreflective device.

18. A target identification system as claimed in claim 11 further including narrow band wavelength-selective filters for filtering the respective reflected signal from each of the at least one retroreflective device.

19. A receiver-transmitter for a target identification system as claimed in claim 2 wherein the array of photodetectors is a rectangular array of N×N photodetectors.

20. A receiver-transmitter for a target identification system as claimed in claim 2 wherein the array of photodetectors is a quadrant array of four photodetectors.

* * * * *